(12) United States Patent
Stearns et al.

(10) Patent No.: US 6,434,629 B1
(45) Date of Patent: Aug. 13, 2002

(54) COMPUTING SYSTEM WHICH IMPLEMENTS RECORDING AND PLAYBACK OF SEMANTIC COMMANDS

(75) Inventors: Glenn Stearns, Scotts Valley; Barbara B. Packard, Los Altos Hills; Ralph Thomas Watson, San Jose, all of CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 08/288,139

(22) Filed: Aug. 9, 1994

Related U.S. Application Data

(60) Continuation of application No. 08/089,384, filed on Jul. 9, 1993, now abandoned, which is a continuation of application No. 07/843,689, filed on Feb. 28, 1992, now abandoned, which is a division of application No. 07/197,478, filed on May 23, 1988, now Pat. No. 5,117,496.

(51) Int. Cl.[7] .................................................. G06F 11/32

(52) U.S. Cl. ........................................ 709/320; 700/86

(58) Field of Search ................................. 364/191, 192, 364/193, 188, 190; 345/115, 119, 120, 163; 395/159, 155, 161, 700, 800

(56) References Cited

U.S. PATENT DOCUMENTS

| | | | | |
|---|---|---|---|---|
| 4,692,858 A | * | 9/1987 | Redford et al. | 395/157 |
| 4,696,003 A | * | 9/1987 | Kerr et al. | 371/19 |
| 4,755,808 A | * | 7/1988 | Bullock et al. | 340/709 |
| 4,827,404 A | * | 5/1989 | Barstow et al. | 395/500 |
| 4,852,047 A | * | 7/1989 | Lavalle et al. | 364/191 |
| 4,866,638 A | * | 9/1989 | Cosentio et al. | 395/159 |
| 4,974,173 A | * | 11/1990 | Stefik et al. | 395/153 |
| 5,008,853 A | * | 4/1991 | Bly et al. | 395/153 |
| 5,117,496 A | * | 5/1992 | Stearns et al. | 395/700 |

FOREIGN PATENT DOCUMENTS

EP    A-0236744    2/1987

OTHER PUBLICATIONS

J.L. Bennett, "Tools for Building Advanced User Interfaces", IBM Systems Journal, vol. 25, Nos. 3–4, part 1, 1986, pp. 354–368.

E. Edmond et al., The SYNICS2 User Interface Manager, Interact '84, Human Computer Interaction, 1985, pp. 375–378.

EPO Search Report.

(List continued on next page.)

Primary Examiner—Richard L. Ellis

(57) ABSTRACT

A computing system includes a viewing screen, user interface means, a plurality of application processes, a data file and agent engine means. The viewing screen displays images. The user interface means enables a user to select and move the images displayed by the viewing screen. Each application process in the plurality of application processes includes command processor means and action processor means. The command processor means receives semantic commands and executes the semantic commands. The action processor means monitors selection and movement of the images on the viewing screen and generates the semantic commands by lexical and syntactical analysis of the selection and movement of the images on the viewing screen. The semantic commands are sent to the command processor for execution. The data file includes first semantic commands executable by a first application process from the plurality of application processes. The agent engine means retrieves the first semantic commands and sends the first semantic commands within the data file to the command processor means of the first application process.

15 Claims, 18 Drawing Sheets

OTHER PUBLICATIONS

Robson, David, "Object–Oriented Software Systems," Byte, 1981, pp. 74, 76, 78, 80, 82, and 86.*

Xerox, "The Smalltalk–80 System," Byte, 1981, pp. 36–48.*

Tesler, Larry, "The Smalltalk Environment," Byte, 1981, pp. 90, 94, 96, 98, 100, 102, 104, 106, 108, 110, 112, 114, 116, 118, 120, 122, 124, 126, 128, 132, 134, 138, 140, 142, 144 and 147.*

Krasner, Glenn, "The Smalltalk–80 Virtual Machine," Byte, 1981, pp. 300, 302, 304, 306, 308, 310, 312, 314, 316–318, and 320.*

Foster, Gregg, "Collaborative Systems and Multi–User Interfaces," Ph.D. Thesis, Oct. 31, 1986.*

Bobrow et al., "The Loops Manual," Xerox, 1983, p. 1–124.*

* cited by examiner-

COMPUTING SYSTEM WHICH IMPLEMENTS RECORDING AND PLAYBACK OF SEMANTIC COMMANDS

This application is a continuation of application Ser. No. 08/089,384, filed Jul. 9, 1993, now abandoned, which was a continuation of application Ser. No. 07/843,689, filed Feb. 2, 1992, now abandoned, which was a division of application Ser. No. 07/197,478, filed May 23, 1988 now U.S. Pat. No. 5,117,496.

BACKGROUND

The present invention relates to the use of an agent to compile, record, playback and monitor commands used by programs running on a computer.

In many application programs there is a facility for recording keystrokes made by a user in interacting with the application program. These keystrokes, stored in a macro file, may be later played back. This use of playback using a macro can allow a user to simply re-execute a complicated set of commands. Additionally, the user can simplify down to the running of a macro an often repeated task.

Typically, this type of use of macros has been utilized on a syntax level. What is meant herein by "syntax level" is the action a user makes, such as keystrokes or movements of a mouse, in order to interact with an application. For instance, macro files created for later playback, typically store a series of keystrokes. An application executing a macro merely replays the stored keystrokes, and executes them as if a user were typing the keystrokes on the keyboard.

To simplify the creation of macro files, an application often has a "record" mode which allows a user to interact with the application program to perform a task. The keystrokes the user uses in performing the task are recorded in a macro file. The macro file then may be played back whenever it is desired to repeat the task.

Although storing keystrokes in macro files for playback is a useful practice, it is inadequate in many respects. For example, current schemes for storing keystrokes in macro files are application dependent. They are implemented by a particular application which has its own set of standard rules. Further, such schemes operate syntactically, requiring a user to understand the syntax of a particular application in order to create a macro file which will operate correctly on that application. Additionally, there is no feedback inherent in the system to account for any differences in the location or state of objects between the time the keystrokes are recorded and the time the keystrokes are played back. Furthermore, there is typically no way to create macro files which when played back operate outside the particular application by which the macro file is created.

SUMMARY OF THE INVENTION

In accordance with the preferred embodiments of the present invention a computing system is presented which includes a plurality of applications. Each application program includes an action processor which receives messages containing user syntactic actions. These actions are translated into semantic commands. The semantic commands are sent to a command processor for execution.

The preferred embodiment of the computing system additionally includes an agent engine. The agent engine may be used to perform many functions. It may be used to receive semantic commands from an application, and to record the semantic commands for later playback. It may be used to send semantic commands from a task language file to an application program for execution by the command processor. It may be used to intercept semantic commands sent from action processor to the command processor. After the command is intercepted, the agent engine may be used to allow the semantic command to be executed or to prevent the semantic command from being executed. The ability to intercept semantic commands is especially useful in computer based training.

The present invention allows great versatility in the ability of a user to interact with an application. The user may record, playback and monitor actions performed by an application at the semantic command level, rather than the user syntactic level. This and other advantages of the present invention are evident from the description of the preferred embodiment below.

DESCRIPTION OF THE PREFERRED EMBODIMENT

Figure 1:
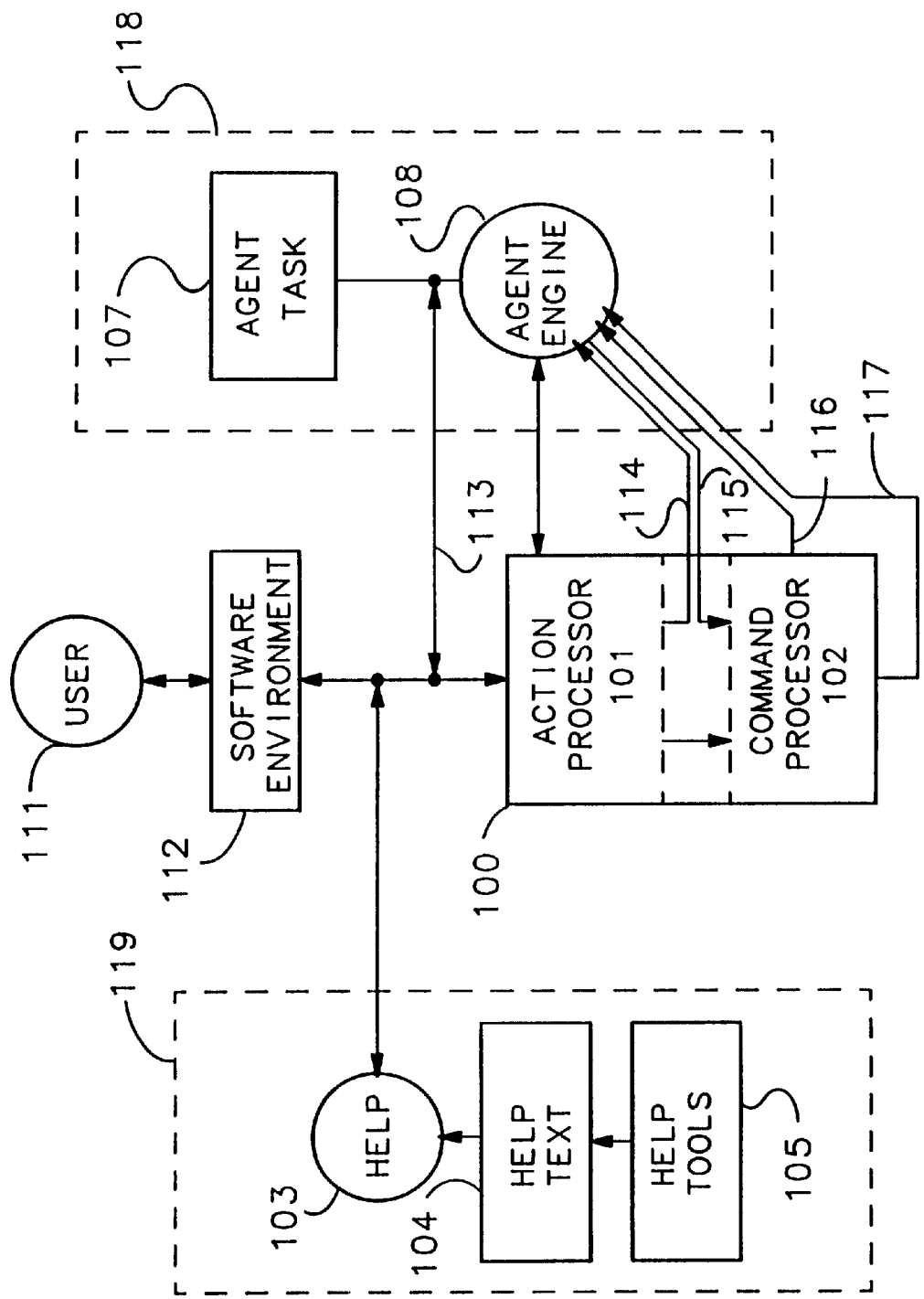
FIG. 1 is a block diagram which shows the interaction between an application, an agent environment and a help environment.

FIG. 1 is a block diagram of a computing system in accordance with a preferred embodiment of the present invention. A user 111 communicates with the computing system through a software environment 112. Software environment 112 may be, for instance, Microsoft Windows, a program sold by Microsoft Corporation, having a business address at 16011 NE 36th Way, Redmond, Wash. 98073-9717. Software environment 112 interacts with an application 100. Messages containing information describing user actions are sent to application 100 by software environment 112. In the preferred embodiment the messages containing user actions are standard messages sent by Microsoft Windows. Application 100 includes an action processor 101 which converts syntactic user actions to a single semantic command. For example, action processor 101 observes the clicks and movements of a mouse used by a user, and waits until a syntactically meaningful command has been generated. Action processor 101 is able to syntactically interpret the many ways a user can build a particular command. In addition to syntactic user actions, action processor 101 also processes other messages from which come to application 100. Some messages will result in a semantic command being generated; others will be dealt with entirely by action processor 101.

Application 100 also includes a command processor 102 which executes semantic commands. Command processor 102 receives semantic commands in internal form (internal form is discussed more fully below) and returns an error if a command cannot be executed.

Application 100 and software environment 112 interact with help environment 119 at the level of the interface between software environment 112 and application 100. Help environment 119 includes a help application 103, which utilizes a help text 104. Help environment 119 also includes help tools 105 which are used to generate help text 104.

Software environment 112 also interacts with an agent environment 118. Agent environment 118 includes an agent task 107 and an agent engine 108.

Agent engine 108 interacts with application 100 at five different conceptual categories, in order to perform five functions. Agent engine 108 interacts with action processor 101 through a data channel 113 for the purpose of interrogation. Agent engine 108 interacts between action processor 101 and command processor 102 through a data channel 114 for the purpose of monitoring the activities of application 100. Agent engine 108 interacts with command processor 102 through a data channel 115 for the purpose of having commands executed by application 100. Agent engine 108 interacts with command processor 102 through a data channel 116 for the purpose of handling errors in the processing of a command within application 100. Agent engine 108 interacts with command processor 102 through a data channel 117 for the purpose of recording execution of application 100 and receiving notification of the completion of a command.

In the preferred embodiment of the present invention, commands may be represented in four ways, (1) in task language form, stored as keywords and parameters, (2) in pcode form, which are binary codes in external form with additional header interpreted by agent 108; (3) in external form, which are binary data understood by application 100 and which are passed between agent 108 and application 100; and (4) in internal form, as binary commands which are executed within application 100. The four ways of representing commands are further described in Appendix A attached hereto.

Figure 2:
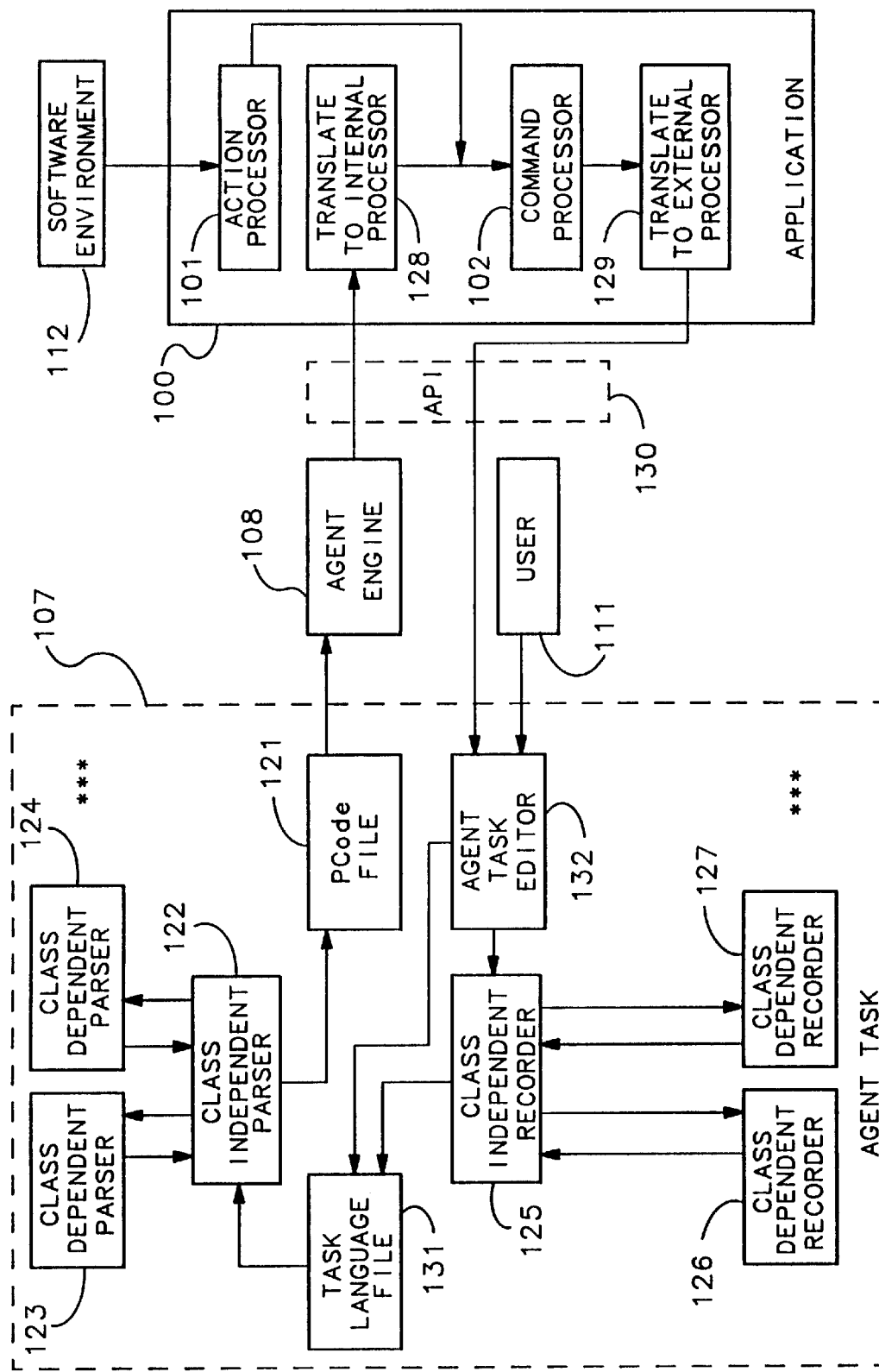
FIG. 2 is a block diagram which shows how a task language file is generated and executed in accordance with the preferred embodiment of the present invention.

FIG. 2 shows a block diagram of how the overall agent system functions. A task language file 131 is a file containing task language. Task language is the text form of commands that describe an application's functionality. Task language is comprised of class dependent commands and class independent commands. Class dependent commands are commands which are to be performed by an application. In FIG. 2, just one application, application 100 is shown; however, agent 108 may interact with many applications.

In the preferred embodiment of the present invention, data files to be operated on by applications are referenced by the use of objects. Each object contains a reference to a data file and a reference to an application. Those objects which refer to the same application are said to be members of the same class. Each application executes a different set of commands. Class dependent commands therefore differ from application to application.

Agent 108 executes class independent commands which are commands understood by agent 108. Class independent commands are executed by agent 108, not by an application.

Task language file 131 is used by a class independent parser 122 to prepare a pcode file 121. In preparing pcode file 121, independent parser 122 calls class dependent parsers 123, 124 and etc. As will be further described below, a class dependent parser is a parser which generates class dependent commands which are encapsulated in pcode form. Agent 108 extracts the commands in their external form from the pcode form and forwards these commands to the appropriate application. A class field within the pcode indicates which application is to receive a particular class dependent command. Class independent parser 122 is a parser which generates pcodes which are executed by agent 108.

Task language file 131 may be prepared by user 111 with an agent task editor 132. Alternately, task language file may be prepared by use of a class independent recorder 125 which utilizes class dependent recorders 126, 127 and etc. Generally, a recorder records the commands of applications for later playback. When the computing system is in record mode, agent task editor 132 receives input from applications, such as shown application 100, which detail what actions agent engine 108 and the applications take. Applications communicate to agent task editor 132 through an application program interface (API) 130. Agent task editor 132, forwards data to class independent recorder 125 when the computing system is in record mode, and to task language file 131 when agent task editor is being used by user 111.

Class independent recorder 125 receives the information and builds task language file 131. When class independent recorder 125 detects that agent task editor 132 is forwarding information about an action taken by an application, class independent recorder calls the class dependent recorder for that application, which then generates the task language form for that action. Class independent recorder 108 generates the task language form for actions taken by agent engine.

When executing pcode file 121, agent engine 108 reads each pcode command and determines whether the pcode command contains a class independent command to be executed by agent 108, or a class dependent command to be executed by an application. If the pcode command contains a class independent command, agent 108 executes the command. If the pcode command contains a class dependent command, agent 108 determines by the pcode command the application which is to receive the command. Agent 108 then extracts a class dependent command in external form, embedded within the pcode. This class dependent command is then sent to the application. For instance, if the class dependent command is for application 100, the class dependent command is sent to application 100. Within application 100 a translate to internal processor 128 is used to translate the class dependent command—sent in external form—to the command's internal form.

In the interactions between agent engine 108 and application 100, API 130 is used. API 130 is a set of functions and messages for accessing agent engine 108 and other facilities.

Figure 3:
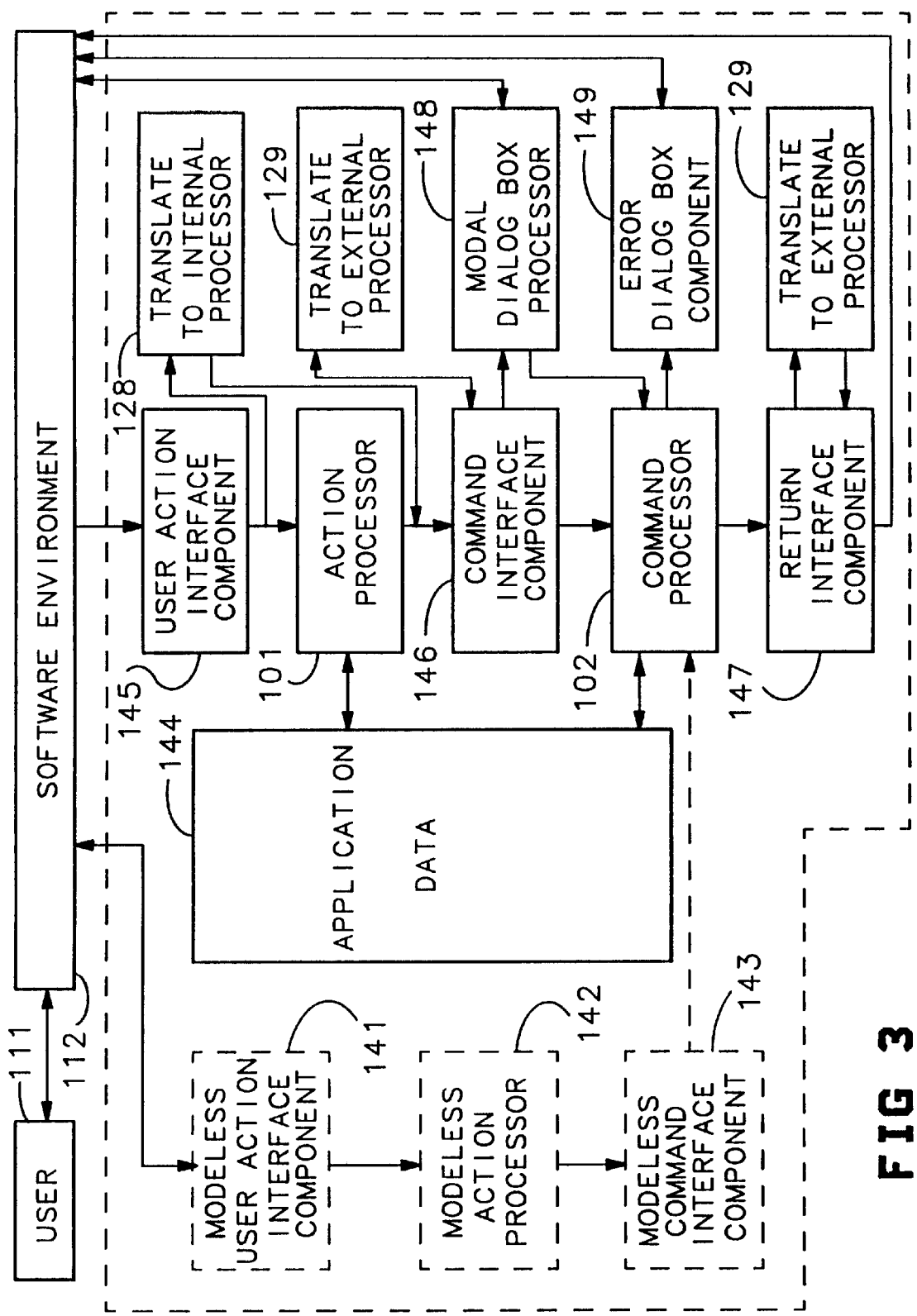
FIG. 3 is a block diagram of the application shown in FIG. 1 in accordance with a preferred embodiment of the present invention.

When the system is in record mode, translate to internal processor 128 translates commands from agent engine 108 and feeds them to command processor 102 through a command interface component 146 shown in FIG. 3. A translate to external processor 129 receives commands in internal form that have been executed by command processor 102. The commands are received through return interface component 147, shown in FIG. 3. Translate to external processor 129 translates the commands in internal form to commands in external form. The commands in external form are then transferred through API 130 to task editor 132.

FIG. 3 shows in more detail the architecture of application 100 in the preferred embodiment of the present invention. Application 100 includes a user action interface component 145 which interacts with software environment 112 and command interface component 146 which communicates with both action processor 101 and command processor 102. As shown both action processor 101 and command processor 102 access application data 144. A return interface component 147 is responsive to command processor 102 and returns control back to software environment 112. Translate to external processor 129 is shown to interact with return interface component 147. Return interface component 147 is only called when application 100 is in playback mode or record mode. These modes are more fully described below. Return interface component 147 indicates to agent engine 108 that a command has been executed by application 100 and application 100 is ready for the next command.

Also included in application 100 are a modal dialog box processor 148 and an error dialog box component 149. Both these interact with software environment 112 to control the display of dialog boxes which communicate with a user 111.

Some applications are able to operate in more than one window at a time. When this is done a modeless user action interface component, a modeless action processor, and a modeless command interface component is added for each window more than one, in which an application operates. For example, in application 100 is shown a modeless user action interface component 141, a modeless action processor 142 and a modeless command interface component 143.

Figure 4:
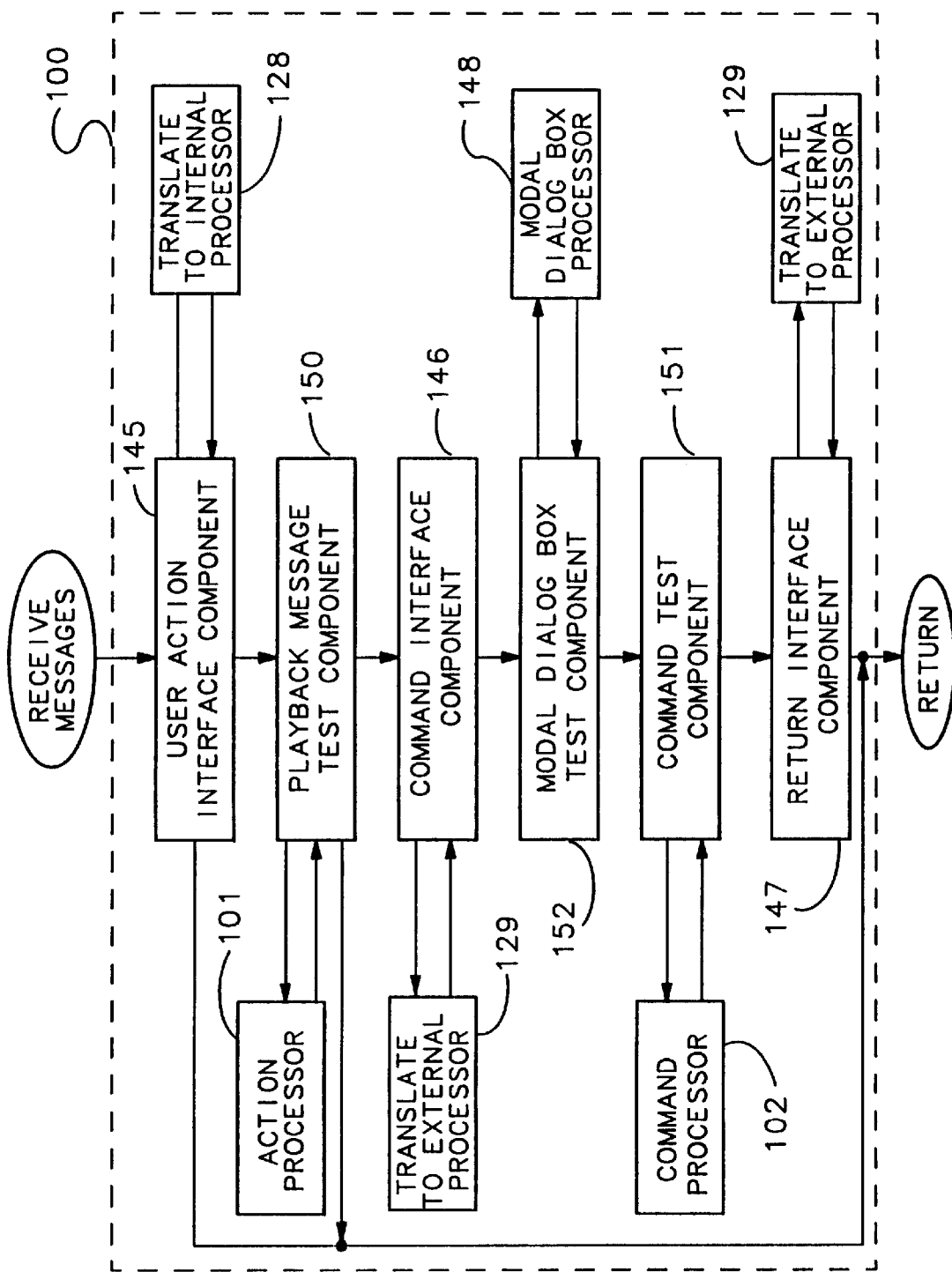
FIG. 4 is a block diagram showing data flow through the application shown in FIG. 1 in accordance with a preferred embodiment of the present invention.

FIG. 4 shows data flow within application 100. Messages to application 100 are received by user action interface component 145. For certain types of messages—e.g., messages from help application 103—user action interface 145 causes application 100 to return immediately. Otherwise the message is forwarded to a playback message test component 150.

If the message is for playback of commands which have been produced either by recording or parsing, the message is sent to translate to internal processor 128 which translates a command within the message from external form to internal form. The command is then forwarded to command interface component 146.

If the message is not a playback message the message is sent to action processor 101 to, for example, syntactically interpret a user's action which caused the generation of the message. If there is no semantic command generated by action processor 101, or produced by internal processor 128 playback message test component 150 causes application 100 to return. If there is a semantic command generated the command is forwarded to command interface component 146.

If agent 108 is monitoring execution of commands by application 100, command interface component 146 sends any data received to translate to external processor 129 which translates commands to external form and transfers the commands to agent 108. Command interface component also forwards data to a modal dialog box test component 152.

If the forwarded data contains a request for a dialog box, modal dialog box test component 152 sends the data to modal dialog box processor 148 for processing. Otherwise modal dialog box test component 152 sends the data to command test component 151.

If the data contains a command, command test component 151 sends the command to command processor 102 for execution. Command test component 151 sends the data to return interface component 147.

If agent 108 is recording commands, return interface component 147 sends the data to translate to external processor 129 for translation to external form and transfer to agent 108 via return interface component 147. Return interface component returns until the next message is received.

The following discussion sets out how actions may be recorded and played back according to the preferred embodiment of the present invention.

Figure 8:
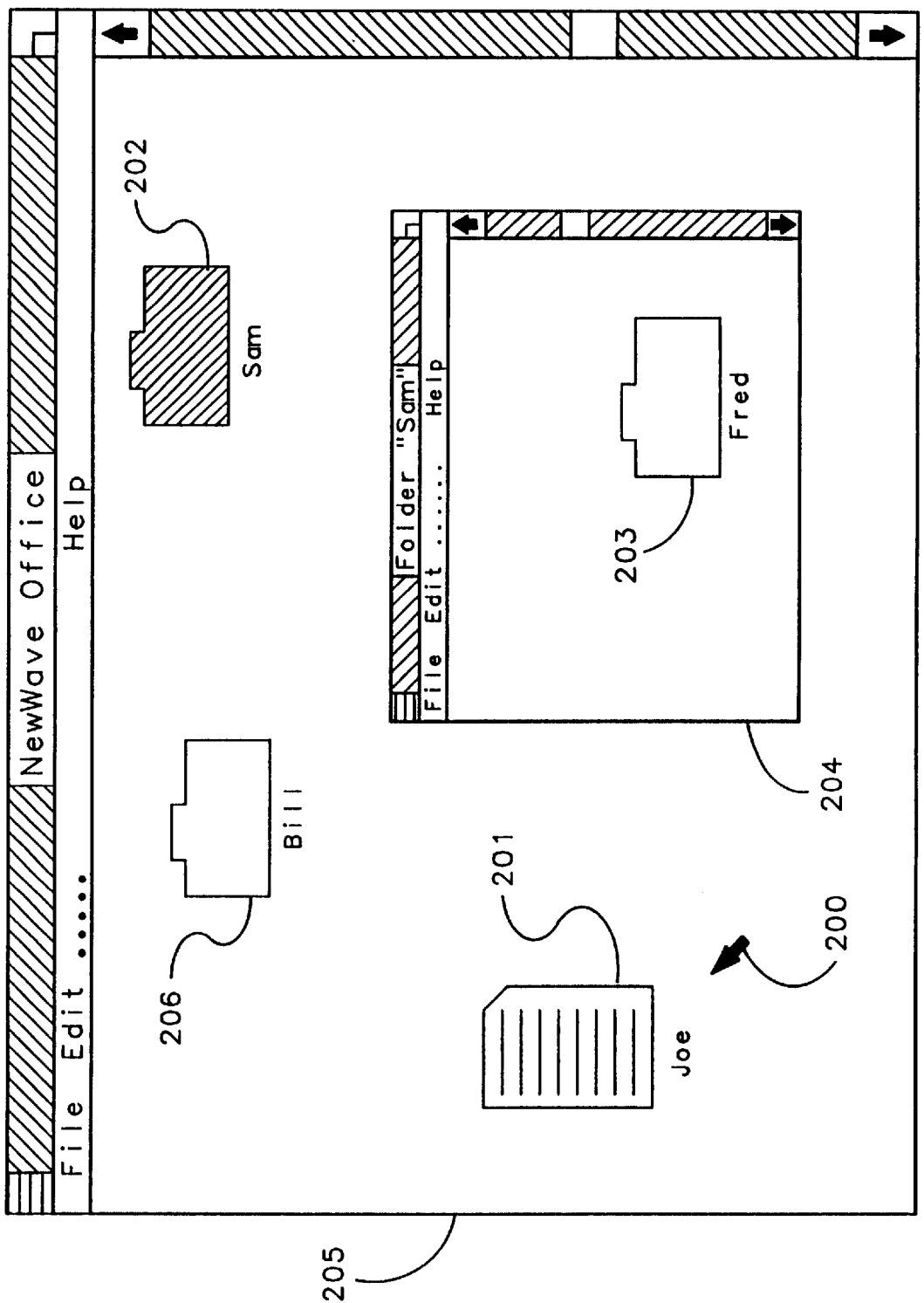
FIGS. 8, 9, 10, 11, 12, 13, 14, 15, 16, 17 and 18 show how the display on the monitor shown in FIG. 6 appears in a user session during which user actions are recorded and played back in accordance with the preferred embodiment of the present invention.

In FIG. 8 an application "NewWave Office" is running in a window 205 as shown. Within window 205 is shown a object "Joe" represented by icon 201, a folder "Bill" represented by an icon 206, and a folder "Sam" represented by an icon 202. Object "Joe" contains a reference to a text file and a reference to an application which operates on the text file. Folder "Sam" has been opened; therefore, icon 202 is shaded and a window 204 shows the contents of Folder "Sam". Within folder "Sam" is a folder "Fred" represented by an icon 203. A cursor 200 is controlled by a mouse 20 or a keyboard 19, as shown in FIG. 6.

Figure 7:
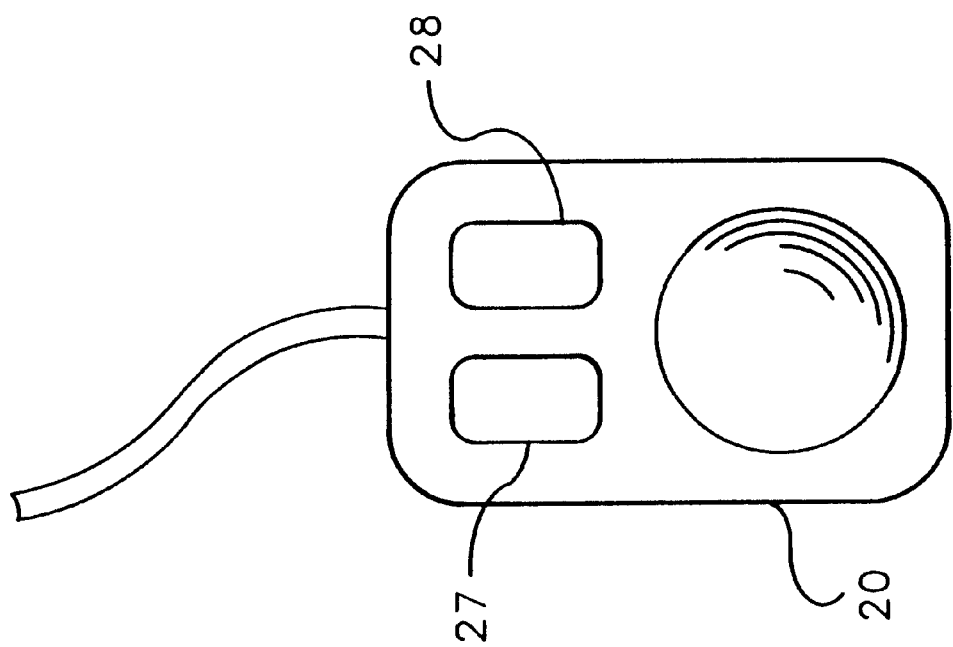
FIG. 7 shows a top view of the mouse shown in FIG. 6.
Figure 6:
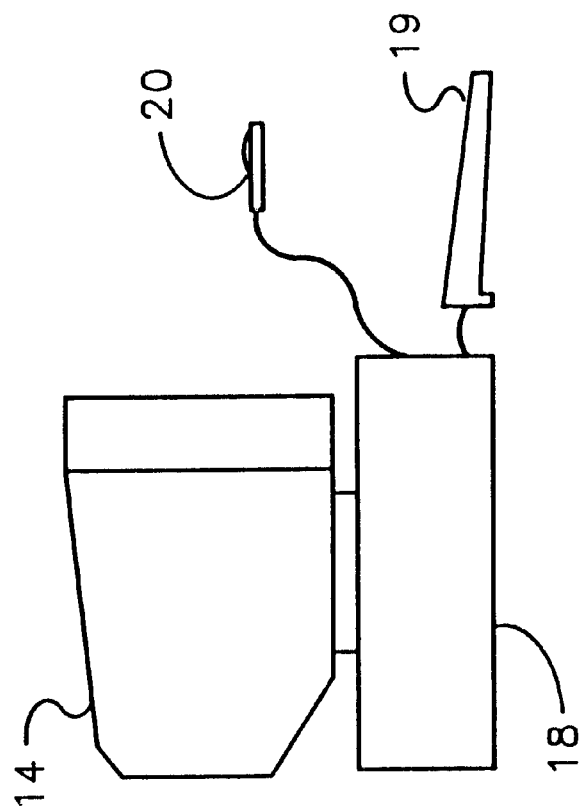
FIG. 6 shows a computer, monitor, keyboard and mouse in accordance with the preferred embodiment of the present invention.

FIG. 6 also shows a computer 18 and a monitor 14 on which window 205 is shown. FIG. 7 shows mouse 20 to include a button 27 and a button 28.

Object "Joe" may be placed in folder "Bill" by using mouse 20 to place cursor 200 over object "Joe", depressing button 27, moving cursor 200 over folder "Bill" and releasing button 27. Similarly, object "Joe" may be placed within folder "Sam" by using mouse 20 to place cursor 20 over object "Joe", depressing button 27, moving cursor 200 within window 204 and releasing button 27. Finally, object "Joe" may be placed in folder "Fred" by using mouse 20 to place cursor 20 over object "Joe", depressing button 27, moving cursor 200 over folder "Fred" and releasing button 27.

Placement of object "Joe" in folder "Fred", within folder "Sam" or in folder "Bill" may be recorded as will now be described. Each time a user moves mouse 20, a message containing a syntactic user action is received by user action interface component 145, and relayed to action processor 101 through playback message test component 150. Based on these syntactic user actions, action processor 101 generates a semantic command which is executed by command processor 102.

The following describes the recording of the placement of object "Joe" in folder "Bill". In FIG. 8, window 205 is active. Cursor 200 may be moved about freely in window 205. When user moves mouse 20, syntactic user actions are sent to action processor 101 as described above. Action processor 101 keeps track of the coordinate location of cursor 200. When button 27 is depressed, action processor 101 checks to see what exists at the present coordinate location of cursor 200. If cursor 200 is placed over object "Joe" when button 27 is depressed, action processor 101 discovers that object "Joe" is at the location of cursor 200. At this time action processor 101 generates a semantic command "Select Document 'Joe'". The semantic command is passed through playback message test component 150, through command interface component 146 through modal dialog box test component 152 through command test component 151 to command processor 102, which performs the semantic command. The semantic command is also received by Return Interface Component 147 and sent to translate to external processor 129. Translate to external processor puts the command in external form and sends it to class independent recorder 125 and thus to class dependent recorder 126 which records the command in task language form in a task language file.

Figure 9:
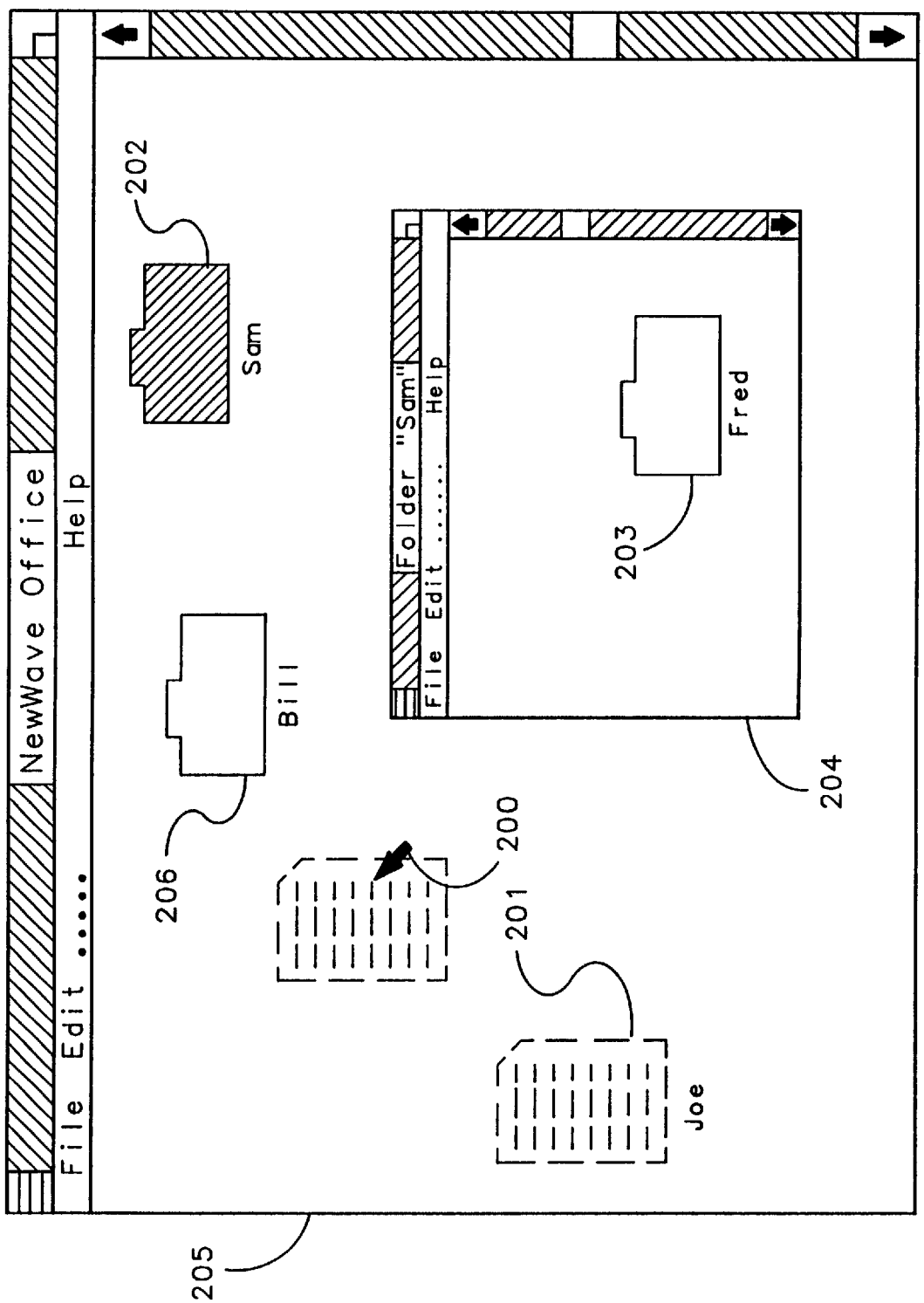
Figure 10:
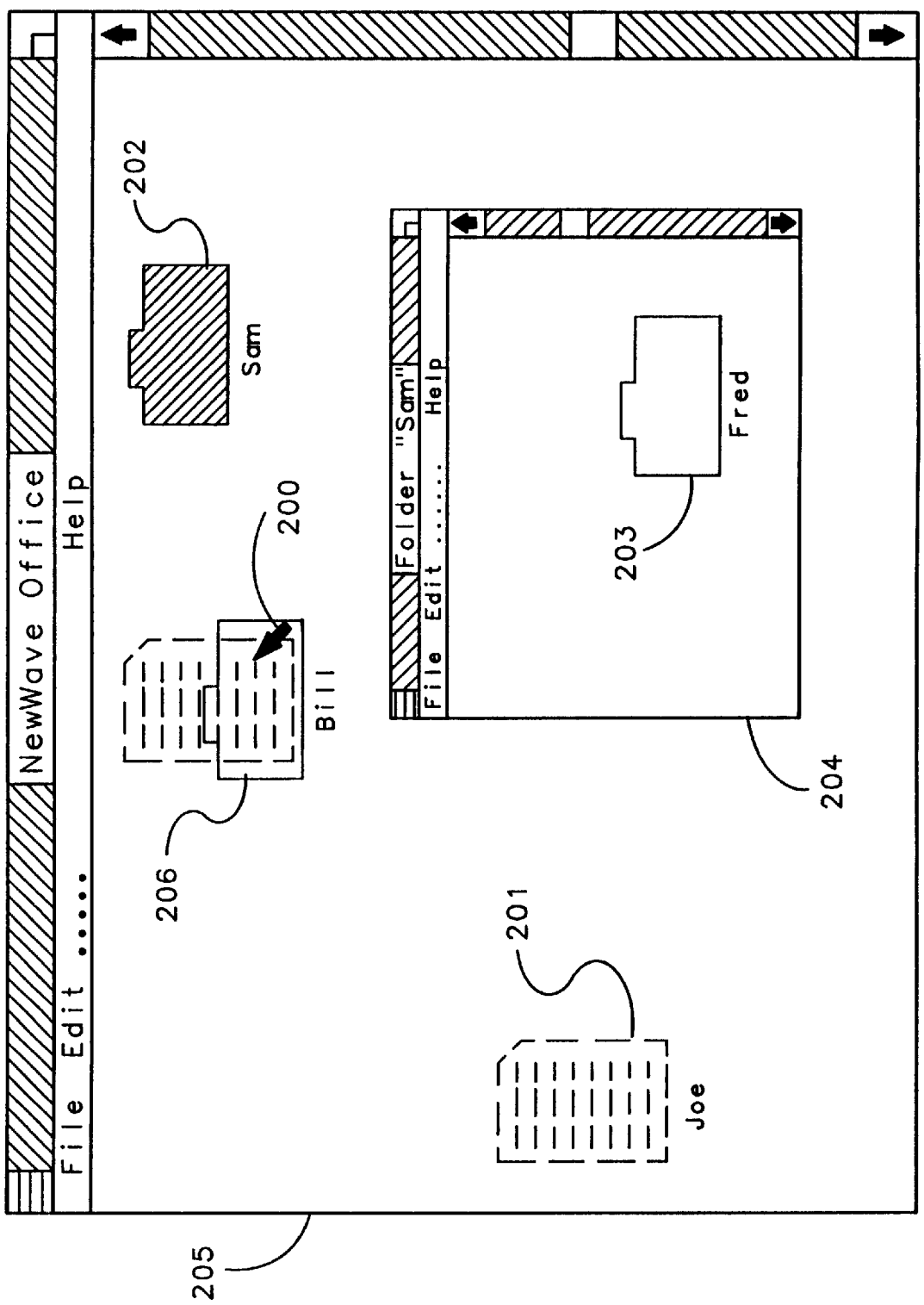

As mouse 20 is moved syntactic user actions continue to be sent to action processor 101. Action processor continues to keep track of the coordinate location of cursor 200. In FIG. 9, cursor 200 is shown to be moving a "phantom" of object "Joe". In FIG. 10, cursor 200 is shown to be placed over folder "Bill".

Figure 11:
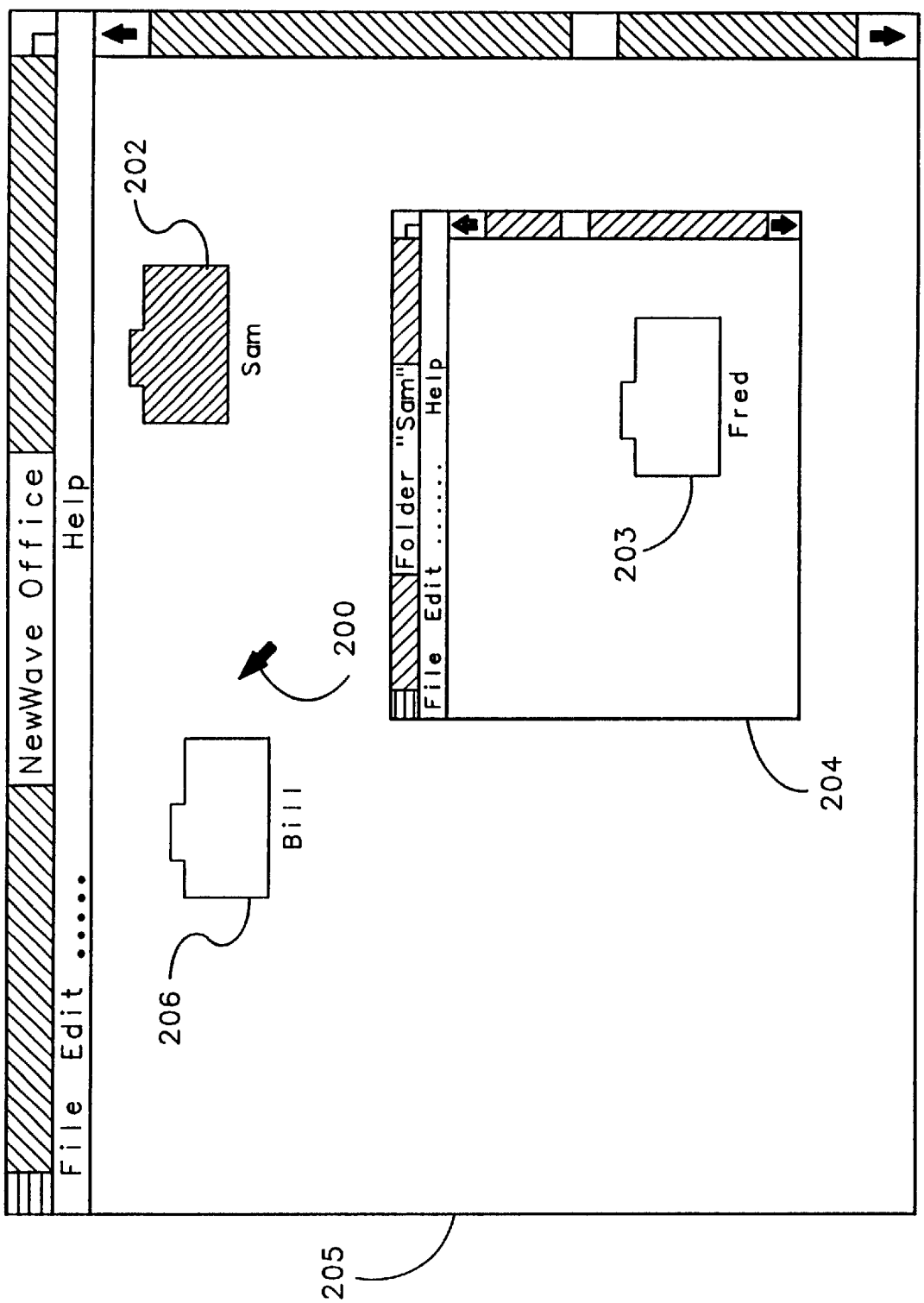
Figure 12:
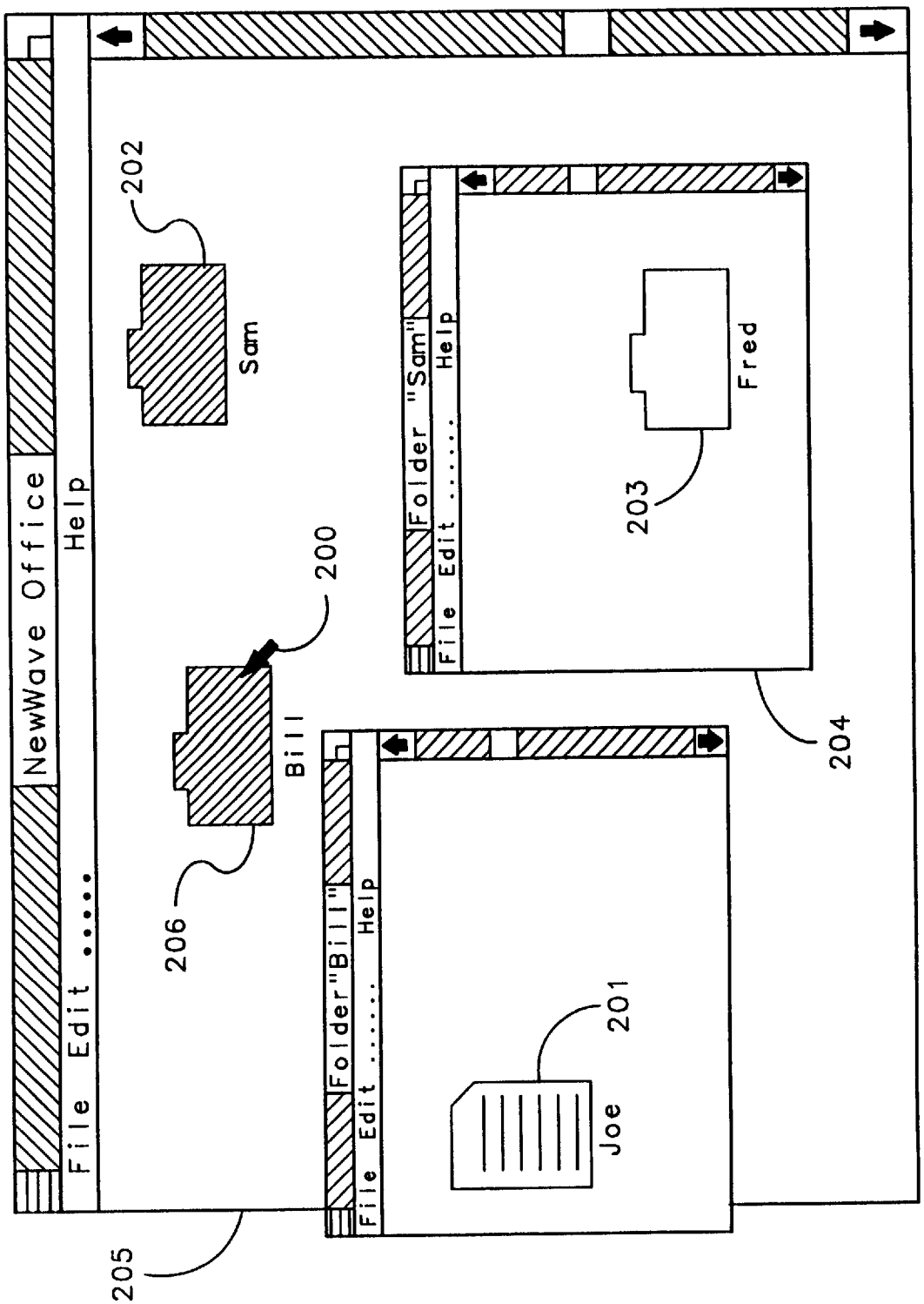

When button 27 is released, action processor 101 generates a semantic command "MOVE_TO Folder 'Bill'". The semantic command is passed to command processor 102, which causes the previously selected object "Joe" to be transferred to folder "Bill". FIG. 11, shows the completed transfer, object "Joe" is in folder "Bill". Translate to external processor 129 puts the command in external form and sends it to class independent recorder 125 and thus to class dependent recorder 126 which records the command in a task language file. When folder "Bill" is opened, as shown in FIG. 12, object "Joe" may be seen.

In this case translate to external processor 129 did not have to get additional information about object "Joe" or folder "Bill", because application "NewWave Office" has within itself information that indicates that object "Joe" and folder "Bill" are on its desktop. Additionally, application 100 "NewWave Office" knows that folder "Bill" is closed.

Recording of the placement of object "Joe" within folder "Sam" is similar to the above. In FIG. 8, window 205 is active. Cursor 200 may be moved about freely in window 205. When button 27 is depressed, action processor 101 checks to see what exists at the present coordinate location of cursor 200. If cursor 200 is placed over object "Joe" when button 27 is depressed, action processor 101 discovers that object "Joe" is at the location of cursor 200. At this time action processor 101 generates a semantic command "Select Document 'Joe'". The semantic command is passed through playback message test component 150, through command interface component 146 through modal dialog box test component 152 through command test component 151 to command processor 102, which performs the semantic command. The semantic command is also received by Return Interface Component 147 and sent to translate to external processor 129. Translate to external processor puts the command in external form and sends it to class independent recorder 125 and thus to class dependent recorder 126 which records the command in a task language file.

Figure 13:
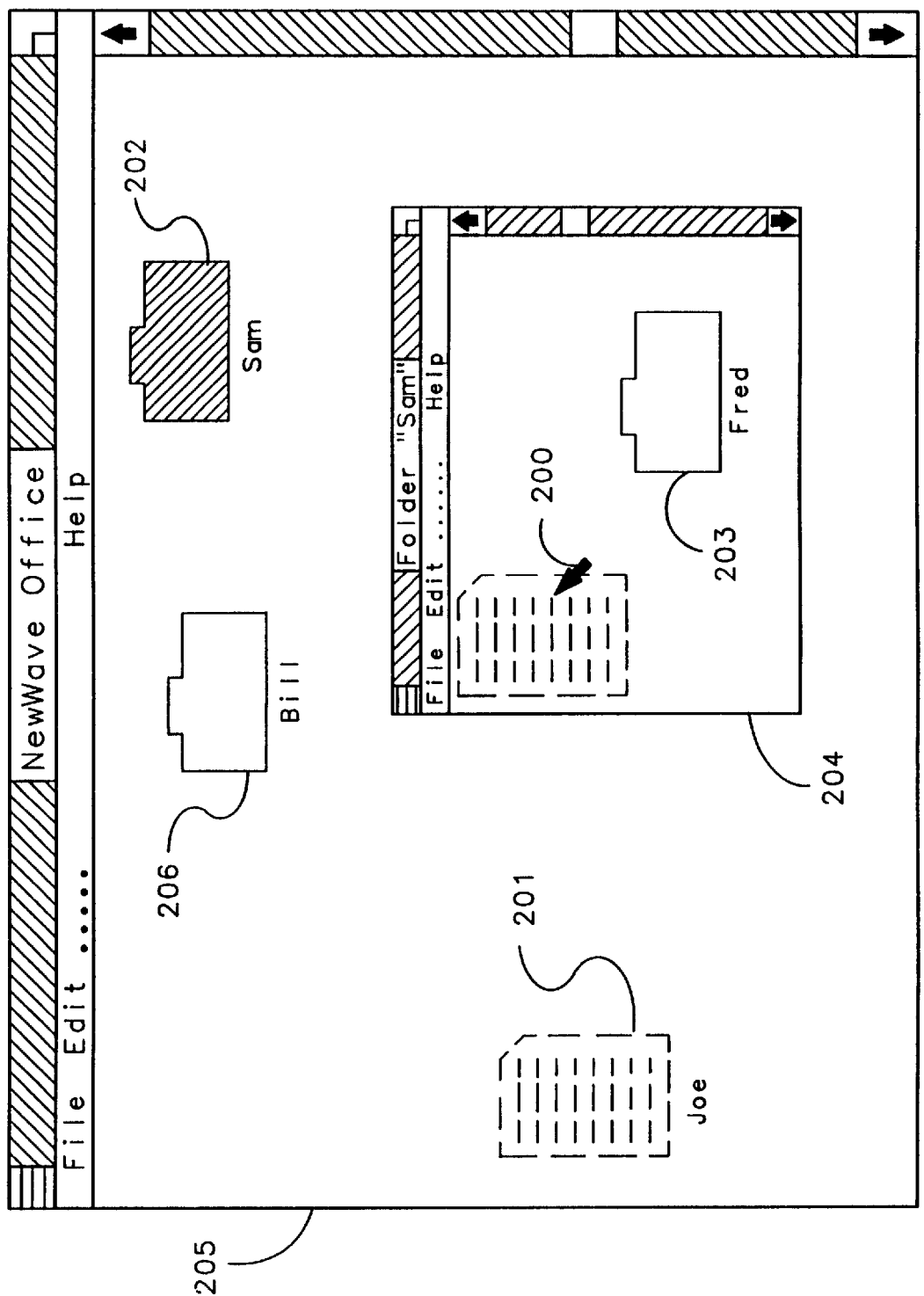

As mouse 20 is moved syntactic user actions continue to be sent to action processor 101. Action processor continues to keep track of the coordinate location of cursor 200. In FIG. 13, cursor 200 is shown to be placed within window 204. When button 27 is released, action processor 101 generates a MOVE_TO Folder "Sam" command. The semantic command is passed to command processor 102, which causes the previously selected object "Joe" to be transferred to folder "Bill". The semantic command is also received by return interface component 147 and sent to translate to external processor 129. Translate to external processor 129 sends an "API_INTERROGATE_MSG". The function of the message is "API_WHO_ARE_YOU_FN". As a result of this message, translate to external processor 129 gets returned data indicating that an open window for folder "Sam" is at the location of cursor 200. Translate to external processor 129 sends another "API_INTERROGATE_MSG". The function of the message is again "API_WHATS_INSERTABLE_AT_FN". Since there there is nothing within window 204 at the location of cursor 200, no additional entity is identified. For a further description of API_INTERROGATE_MSG see Appendix C.

Figure 14:
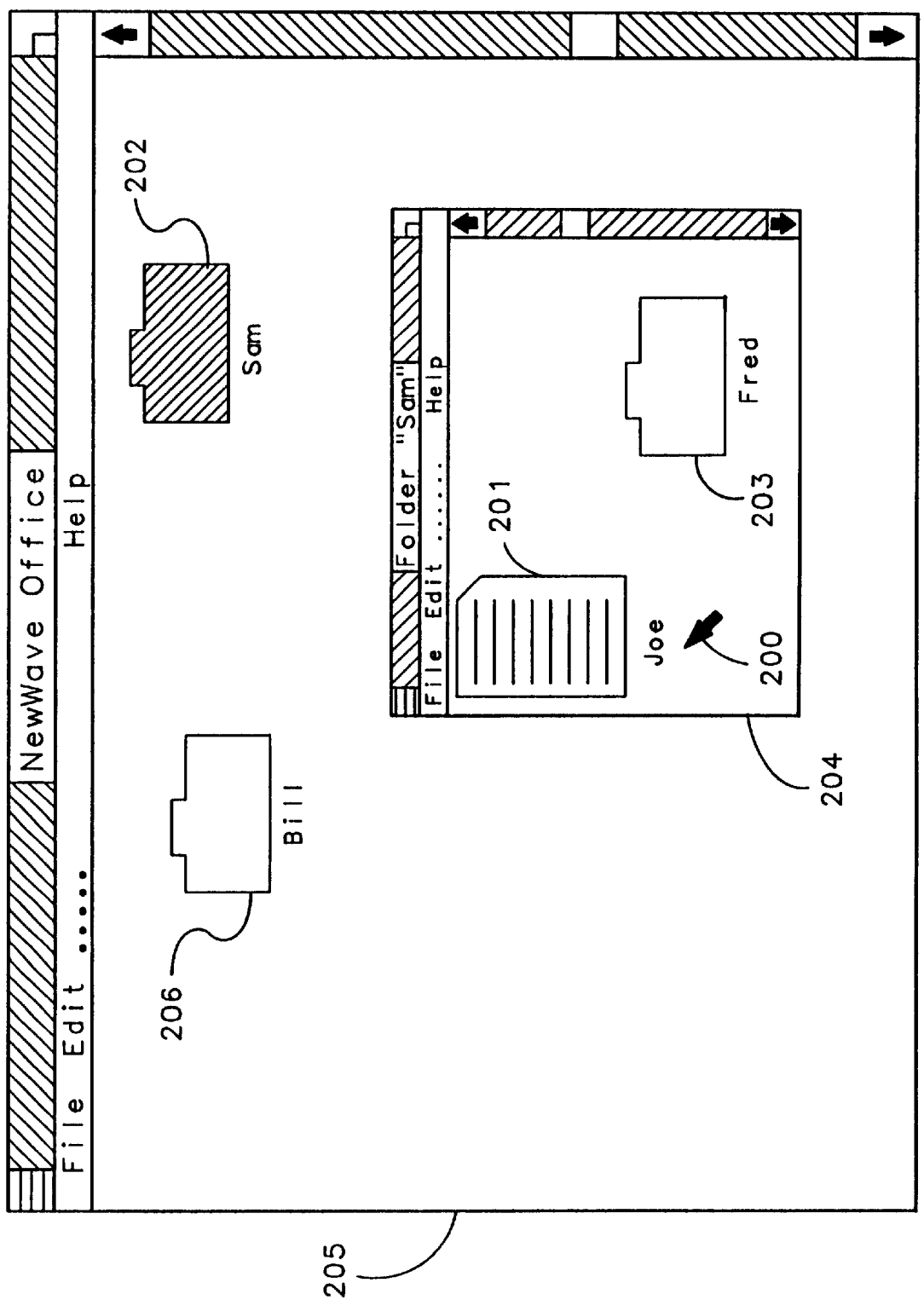

Translate to external processor puts the command in external form and sends it to class independent recorder 125 and thus to class dependent recorder 126, and the command is recorded in task language file 131. FIG. 14 shows the result of the completed transfer: object "Joe" is within window 204.

Figure 15:
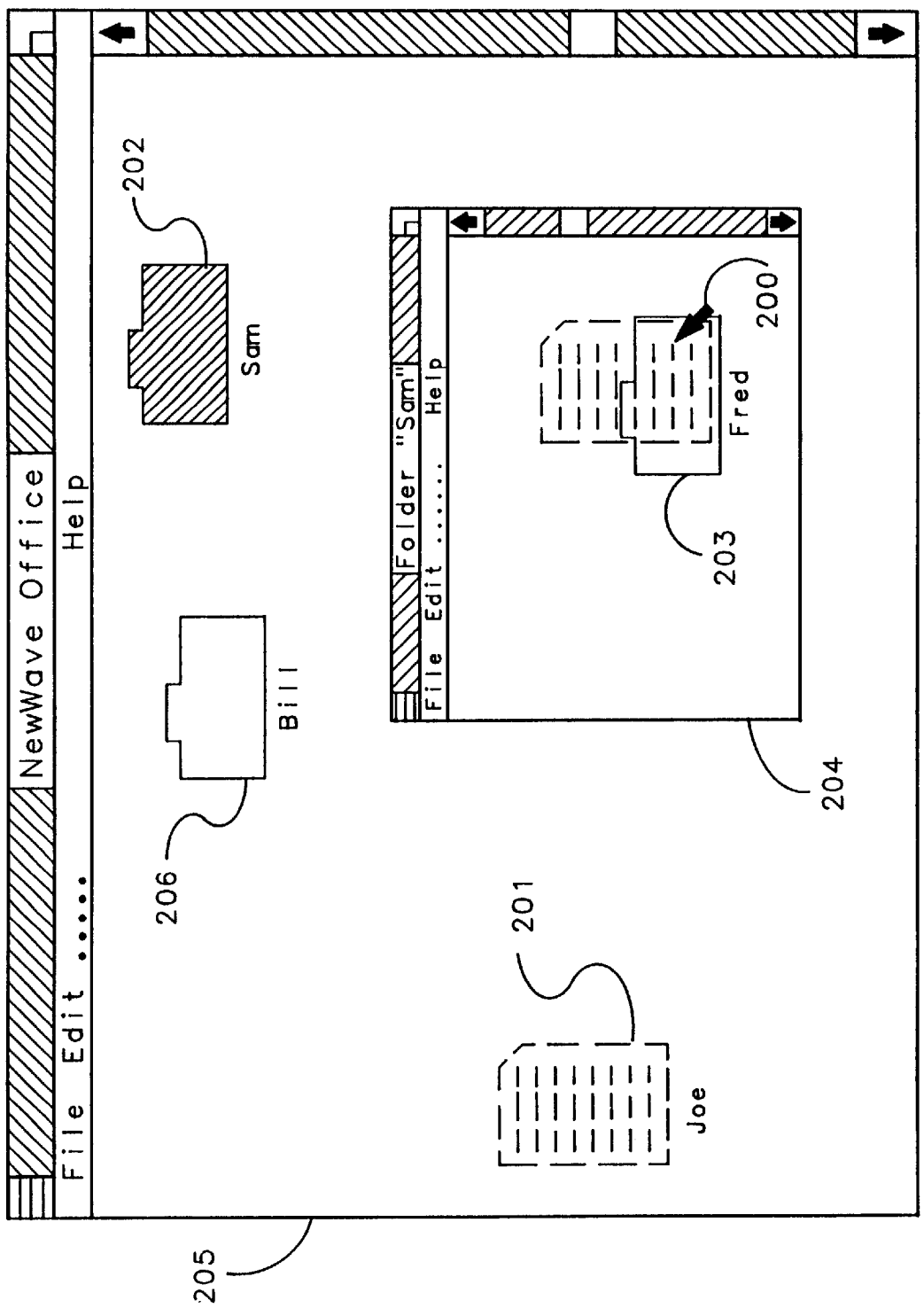

Similarly object "Joe" may be transferred to folder "Fred". In FIG. 15, cursor 200 is shown to be placed over folder "Fred" within window 204. When button 27 is released, action processor 101 generates a semantic command "MOVE_TO Folder 'Fred' WITHIN Folder 'Sam'". The semantic command is passed to command processor 102, which causes the previously selected object "Joe" to be transferred to folder "Fred" within Folder "Sam". The semantic command is also received by return interface component 147 and sent to translate to external processor 129.

Translate to external processor 129 puts the command in external form in the following manner. Translate to external processor 129 sends an "API_INTERROGATE_MSG". The function of the message is "API_WHATS_INSERTABLE_AT_FN". As a result of this message, translate to external processor 129 receives a return message indicating that folder "Fred" is at the location of cursor 200. Translate to external processor sends another "API_INTERROGATE_MSG". The function of the message is "API_WHO_ARE_YOU_FN". As a result of this message, translate to external processor 129 receives return data indicating that folder "Sam" is at the location of cursor 200.

Figure 16:
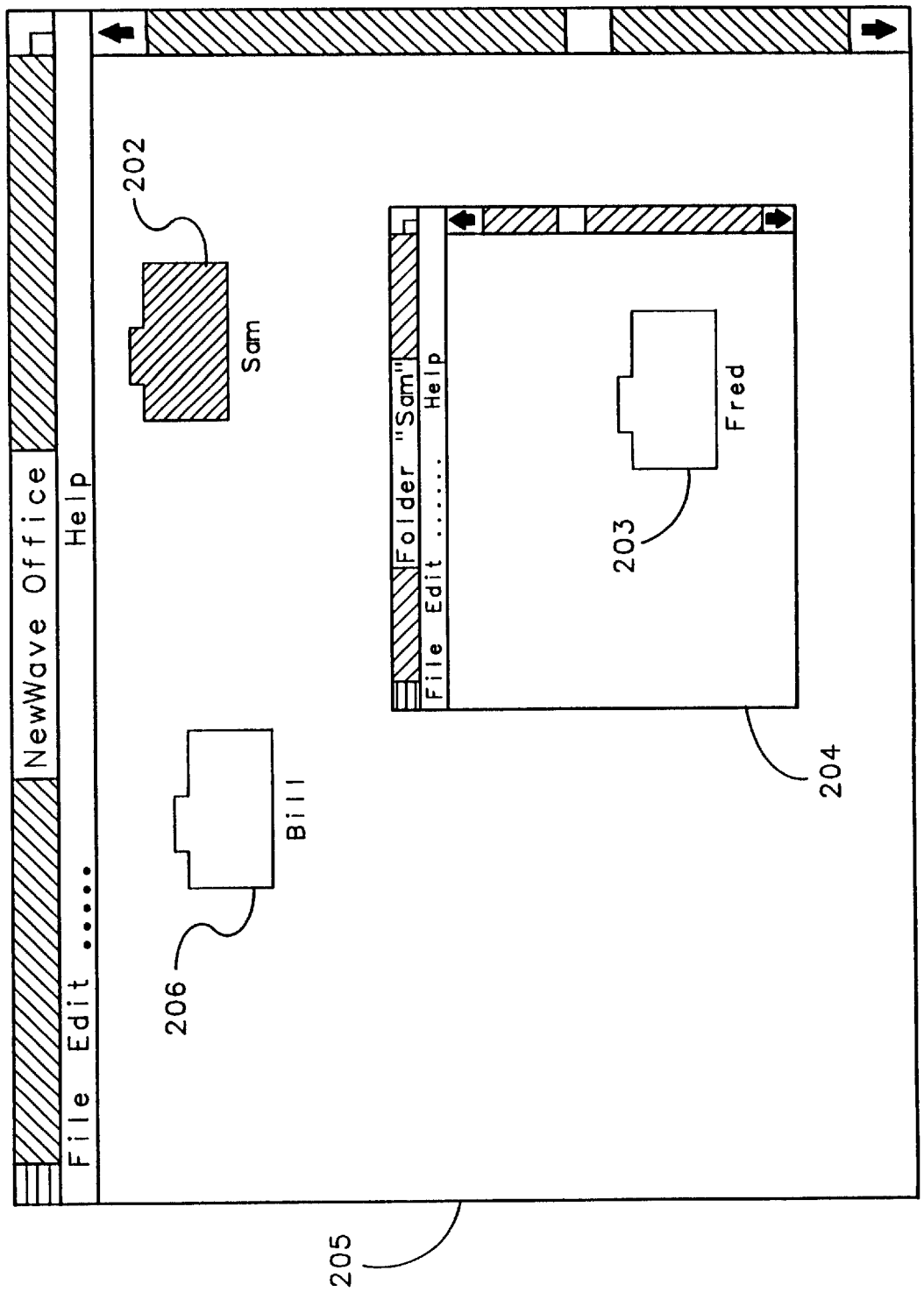
Figure 17:
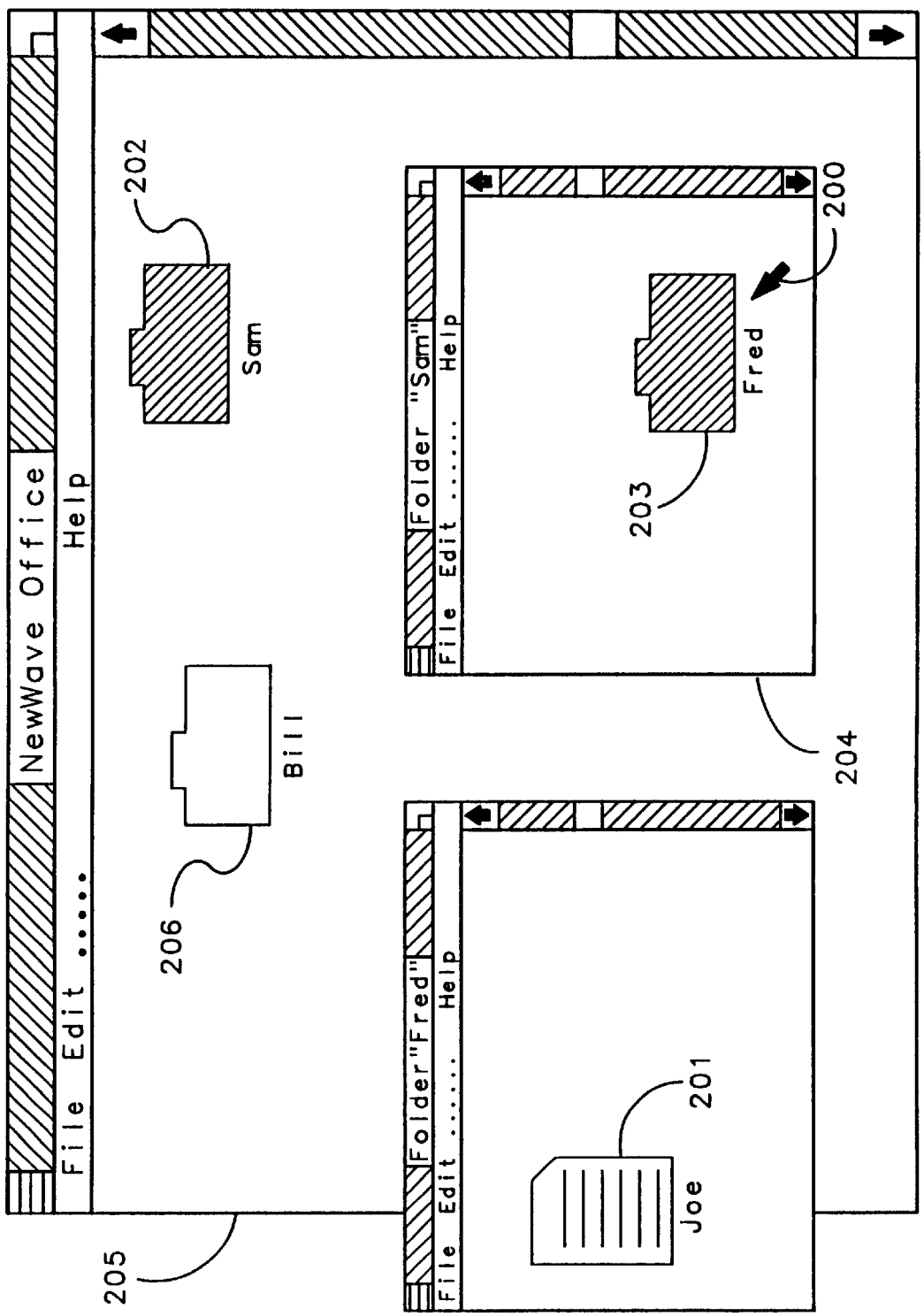

At this time translate to external processor is able to send the command in external form through API 130 to class independent recorder 125 and thus to class dependent recorder 126. Class dependent recorder 126 records the external command in task language file 131. FIG. 16, shows the completed transfer, object "Joe" is in folder "Fred". When folder "Fred" is opened, as shown in FIG. 17, object "Joe" may be seen.

Figure 18:
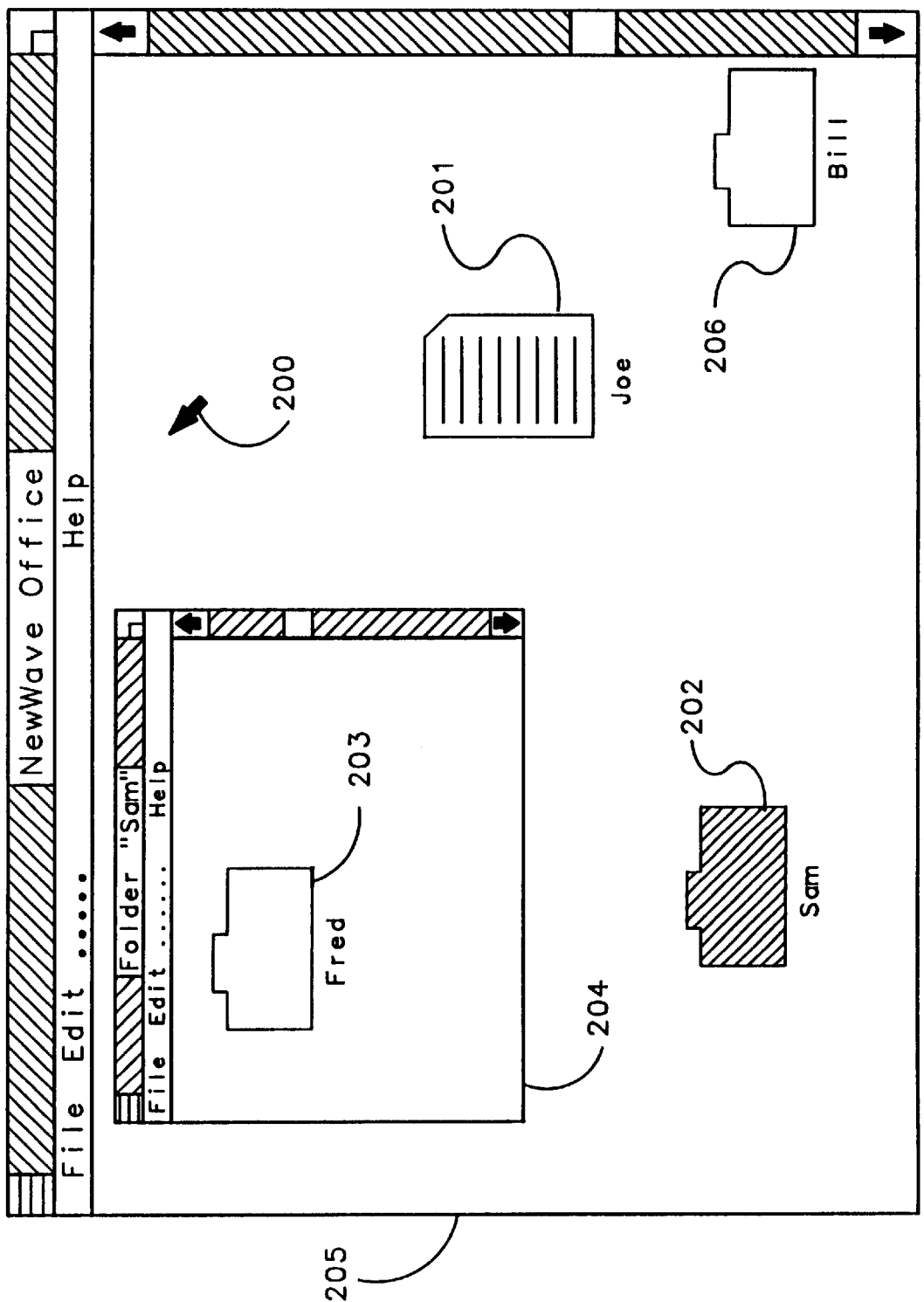

Once in a task language file, the commands which transferred object "Joe" to folder "Fred", may be played back. For instance, suppose window 205 appears as in FIG. 18. Since window 204, object text "Joe" and folder "Fred" are all in different locations within window 205, a mere playback of syntactic user actions would not result in object "Joe" being placed within folder "Fred". However, what was recorded was not syntactic user actions but rather semantic commands; therefore, playback of the semantic commands will cause object "Joe" to be placed within Folder "Fred".

Specifically, suppose a task language file contained the following commands:
  FOCUS on Desktop "NewWave Office"
  SELECT Document "Joe"
  MOVE_TO Folder "Fred" WITHIN Folder "Sam".

Figure 5:
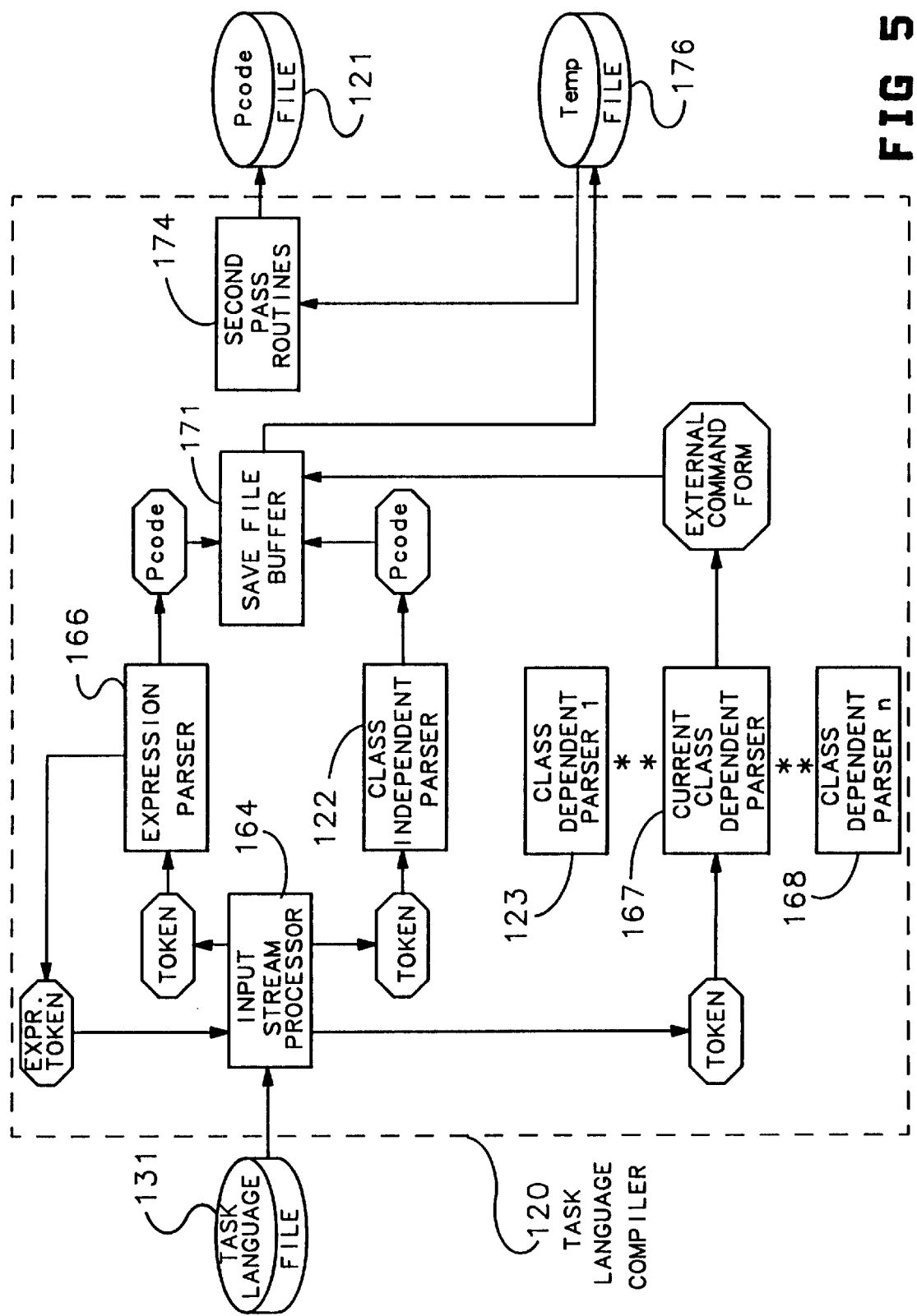
FIG. 5 is a diagram of a compiler in accordance with a preferred embodiment of the present invention.

The first command—FOCUS on Desktop "NewWave Office"—is a class independent command and, once compiled by a task language compiler 120 shown in FIG. 5, may be executed by agent 108. As will be further described below, the FOCUS command places the focus on the application "NewWave Office". This means that the task language commands are, if possible, to be treated as class dependent commands and sent to application "NewWave Office" for execution. For simplicity of discussion, the application "NewWave Office" is taken to be application 100.

The second and third commands—SELECT Document "Joe"—and —MOVE_TO Folder "Fred" WITHIN Folder "Sam"—are class dependent commands. These class dependent commands, once compiled by task language compiler 120 into pcode form, are received by agent engine 108. Agent engine extracts the class dependent commands in external form from the pcode form and sends the class dependent commands to application 100. User action interface component 145 of application 100 receives a message containing the external command and forwards the message to playback message test component 150. Playback message test component 150 ships the command to translate to internal processor 128. Translate to internal processor 128 translates the command from external form to internal form and returns the command in internal form to playback test component 150. The command in internal form is then sent through command interface component 146, through modal dialog box test component 152 through command test component 151 to command processor 102. Command processor 102 executes the command.

Agent 108 executes the command "FOCUS on Desktop 'NewWave Office'", by activating window 205. The position of cursor 200 is now determined with respect to the coordinates of window 205.

When command processor 102 receives the command "SELECT Document 'Joe'", command processor 102 causes object "Joe" to be selected. Since object "Joe" is within window 205 no additional interrogation is necessary.

When constructing the internal command form for the command "MOVE_TO Folder 'Fred' WITHIN Folder 'Sam'", translate to internal processor 128 sends an "API_INTERROGATE_MSG" to each open window. The function of this message is "API_WHO_ARE_YOU FN".

When the window for Folder "Sam" receives this message, it responds with "Folder 'Sam'". Translate to internal processor 128 sends another "API_INTERROGATE_MSG". The function of this message is "API_WHERE_IS_FN". Folder "Fred" is included as a parameter. The message is forwarded to folder "Sam" which returns data indicating the coordinates of folder "Fred" within window 204. Translate to internal processor 128 then generates the internal form of the command MOVE_TO 'Fred' WITHIN Folder "Sam". Command processor 102 receives the command and transfers object "Joe" to folder "Fred".

Task language file 121 may be generated by compiled code written by a user, as well as by recording. In FIG. 5, data flow through a task language compiler 120 is shown. A task language file 131 includes commands written by a user. In the preferred embodiment of the present invention, the task language is written in accordance with the Agent Task Language Guidelines included as Appendix B to this Specification.

Task language compiler 120 is a two pass compiler. In the first pass the routines used include an input stream processor 164, an expression parser 166, a class independent parser 122, a save file buffer 171, second pass routines 174, and class dependent parsers, of which are shown class dependent parser 123, a class dependent parser 167 and a class dependent parser 168. As a result of the first pass a temporary file 176 is created.

Class independent parser 122 parses the class independent task language commands listed in Appendix B. Each application which runs on the system also has special commands which it executes. For each application, therefore, a separate class dependent parser is developed. This parser is able to parse commands to be executed by the application for which it is developed. Class dependent parsers may be added to or deleted from task language compiler 120 as applications are added to or deleted from the system.

When compiling begins, class independent parser 122 requests a token from input stream processor 164. Input stream processor 164 scans task language file 131 and produces the token. Class independent parser 122 then does one of several things. Class independent parser 122 may generate pcode to be sent to save file buffer 171. If class independent parser 122 expects the next token to be an expression, class independent parser 122 will call routine MakeExpression ( ) which calls expression parser 166. Expressions parser 166 requests tokens from input stream processor 164 until the expression is complete. Expression parser 166 then generates pcode to be sent to file buffer 171 and then to be saved in temporary file 176. Additionally, expression parser 166 generates an expression token which is returned to input stream processor 164. Input stream processor 164 delivers this expression to independent parser 122 when it is requested by independent parser 122.

As a result of a FOCUS command, a particular class dependent parser will have priority. Therefore, in its parsing loop, class independent scanner 122a will call the class dependent parser for the application which currently has the focus. The class dependent parser will request tokens from input stream processor 164 until it has received a class dependent command which the semantic routines called by class dependent parser convert to external command form, or until the class dependent parser determines that it cannot parse the expressions that it has received. If the class dependent parser encounters an expression, it may invoke expression parser 166 using the call MakeExpression ( ). If the class dependent parser is unable to parse the tokens it receives, the class dependent parser returns an error and the class independent parser will attempt to parse the tokens.

A FOCUS OFF command will result in independent parser 122 immediately parsing all commands without sending them to a dependent parser. When a string of class independent commands are being parsed, this can avoid the needless running of dependent parser software, thus saving computing time required to compile the task language.

Figure 19:
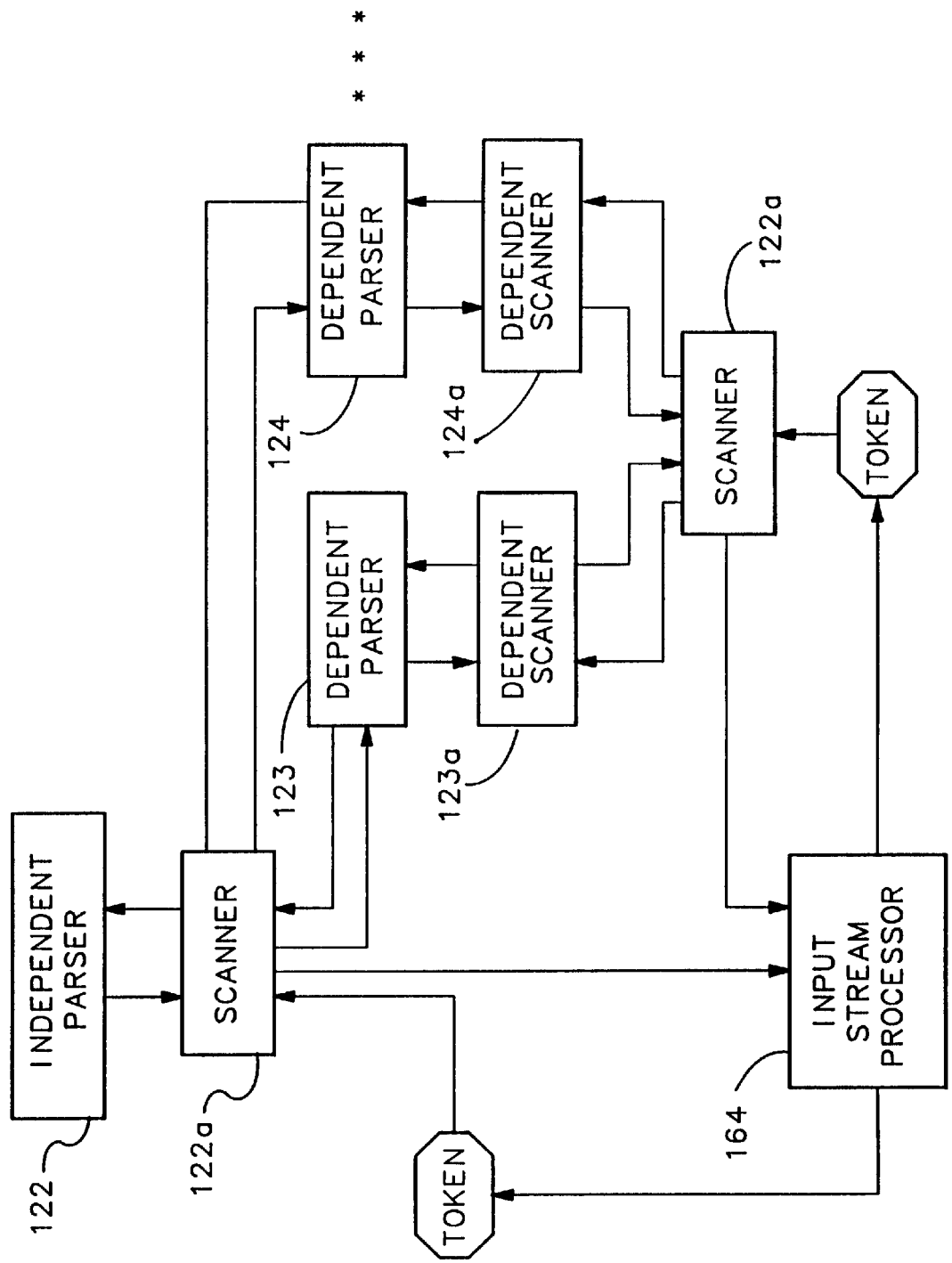
FIG. 19 shows data flow within the compiler shown in FIG. 5.

In FIG. 19 is shown data flow between independent parser 122 and dependent parsers of which dependent parser 123 and dependent parser 124 are shown. In order to focus the discussion on the relationship between parsers, calls to expression parser 166 by scanner 122a are not taken into account in the discussion of FIG. 19.

When independent parser 122 is ready for a token, independent parser 122 calls a scanner routine 122a. Scanner 122a checks if there is a focus on an application. If there is not a focus on an application, scanner 122a calls input stream processor 164 which returns to scanner 122a a token. Scanner 122a returns the token to independent parser 122a.

If there is a focus on an application, the dependent parser for the application has precedence and is called. For instance, when focus is on the application for parser 123, parser 123 calls scanner 122a through a dependent scanner 123a. Scanner 122a checks its state and determines that it is being called by a dependent parser, so it does nor recursively call another dependent parser. Scanner 122a calls input stream processor 164 which returns to scanner 122a a token. Scanner 122a returns the token to dependent parser 123 through dependent scanner 123a. Although the present implementation of the present invention includes dependent scanner 123a, in other implementations dependent scanner 123a may be eliminated and parser 123 may call scanner 122a directly.

Dependent parser 123 will continue to request tokens through dependent scanner 123a as long is dependent parser 123 is able to parse the tokens it receives. With these tokens dependent parser will call semantic routines which will generate class dependent external commands embedded in pcode. When dependent parser 123 is unable to parse a token it receives, dependent parser will return to scanner 122a an error. Scanner 122a then calls input stream processor 164 and receives from input stream processor 164 the token which dependent parser 123 was unable to parse. This token is returned to independent parser 122. Independent parser 122 parses the token and calls semantic routines to generate pcode for execution by agent 108. The next time independent parser 122 requests a token from scanner 122a, scanner 122a will again call dependent parser 123 until there is a FOCUS OFF command or until there is a focus on another application.

When the focus is on the application for dependent parser 124, scanner 122a will call dependent parser 124. Dependent parser 124 calls a dependent scanner 124a and operates similarly to dependent parser 123.

Save file buffer 171, shown in FIG. 5, receives pcode from class independent parser 122 and from expression parser 166, and receives external command forms embedded in pcode from class dependent parsers. Save file buffer 171 stores this information in a temporary file 176. Second pass routines 174 takes the pcode and external command forms stored in temporary file 176 and performs housekeeping, e.g., fixes addresses etc., in order to generate task language file 121.

The following four appendices can be found in full in prior U.S. Pat. No. 5,117,496, incorporated herein by reference.

Appendix A contains an Introduction to API 130 (Programmer's Guide Chapter 4).

Appendix B contains guidelines for developing agent task language (Agent Task Language Guidelines).

Appendix C contains a description of Task Language Internals.

Appendix D contains description of API_INTERROGATE_MSG.

We claim:

1. A computing system comprising:
   a viewing screen which displays images;
   user interface means for enabling a user to select and move the images displayed by the viewing screen;
   a plurality of application processes, each application process including:
      command processor process for receiving semantic commands and for executing the semantic commands, each of the semantic commands identifying an entity being operated on, where identification of the entity is independent of location of the images on the viewing screen, and
      action processor process for monitoring selection and movement of the images on the viewing screen and for generating the semantic commands by lexical and syntactical analysis of the selection and movement of the images on the viewing screen, the semantic commands being sent directly to the command processor for execution;
   a data file which includes first semantic commands executable by a first application process from the plurality of application processes and which includes second semantic commands executable by a second application process from the plurality of application processes; and,
   agent engine process, separate from the plurality of application processes, for retrieving the first semantic commands from the data file, for sending the first semantic commands to the command processor process of the first application process for retrieving the second semantic commands from the data file, and for sending the second semantic commands to the command processor process of the second application process.

2. A computing system as in claim 1, wherein each application process additionally comprises:
   translate to internal form means for receiving the first semantic commands sent by the agent engine process and for translating the first semantic commands into an internal form before forwarding the first semantic commands to the command processor process.

3. A computing system as in claim 2, wherein the agent engine process includes:
   recording means for receiving from application processes within the plurality of application processes the semantic commands executed by the command processor process and for recording the semantic commands in a task language file.

4. A computing system as in claim 3 wherein each application process additionally comprises:
   translate to external form means for translating the semantic commands into an external form before the semantic commands are sent from the application process to the recording means.

5. A computing system as in claim 3 wherein the recording means additionally records in the task language file information describing actions taken by the agent engine process.

6. A computing system comprising:
   a viewing screen which displays images;
   user interface means for enabling a user to select and move the images displayed by the viewing screen;
   a plurality of application processes, each application process including:
      command processor process for receiving semantic commands and for executing the semantic commands,
      action processor process for monitoring selection and movement of the images on the viewing screen and for generating the semantic commands by lexical and syntactical analysis of the selection and movement of the images on the viewing screen, the semantic commands being sent to the command processor for execution, and
      translate to internal form means for receiving the first semantic commands sent by the agent engine process and for translating the first semantic commands into an internal form before forwarding the first semantic commands to the command processor process;
   a data file which includes first semantic commands executable by a first application process from the plurality of application processes;
   agent engine process for retrieving the first semantic commands from the data file and for sending the first semantic commands to the command processor process of the first application process; and,
   recording means for receiving from application processes within the plurality of application processes the semantic commands executed by the command processor process, for recording the semantic commands in a task language file, and for recording in the task language file information describing actions taken by the agent engine process, wherein the recording means comprises:

class independent recorder means for recording in the task language file the information describing actions taken by the agent engine process; and, a plurality of class dependent recorder means, each class dependent recorder means corresponding to an application process in the plurality of application processes, for receiving the semantic commands from its corresponding application process and recording the semantic commands in the task language file.

7. A computing system comprising:

a viewing screen which displays images;

user interface means for enabling a user to select and move images displayed by the viewing screen;

a plurality of application processes, each application process responsive to selection and movement of the images on the viewing screen, and each application process including:

action processor process for monitoring selection and movement of the images on the viewing screen and for generating semantic commands by lexical and syntactical analysis of the selection and movement of the images on the viewing screen, each of the semantic commands identifying an entity being operated on, where identification of the entity is independent of location of the images on the viewing screen, and command processor process for receiving the semantic commands from the action processor and for executing the semantic commands; and recording means for receiving first semantic commands executed by a first command processor from the plurality of application processes, and for recording the first semantic commands in a file, the first semantic commands, after being recorded in the file, giving a history of semantic commands previously executed by the first command processor process.

8. A computing system as in claim 7 additionally comprising:

agent engine process for retrieving the first semantic commands from the file and for sending the first semantic commands to the first command processor to be executed again.

9. A computing system as in claim 8 wherein each application process additionally comprises:

translate to external form means for translating the semantic commands into an external form before the semantic commands are sent from the application process to the recording means.

10. A computing system as in claim 9 wherein the recording means additionally records in the file information describing actions taken by the agent engine process.

11. A computing system comprising:

a viewing screen which displays images;

user interface means for enabling a user to select and move images displayed by the viewing screen;

a plurality of application processes, each application process responsive to selection and movement of the images on the viewing screen and each application process including:

action processor process for monitoring selection and movement of the images on the viewing screen and for generating semantic commands by lexical and syntactical analysis of the selection and movement of the images on the viewing screen, command processor process for receiving the semantic commands from the action processor and for executing the semantic commands, and translate to external form means for translating the semantic commands into an external form before the semantic commands are sent from the application process;

recording means for receiving first semantic commands executed by a first command processor from the plurality of application processes and translated by the translate to external form means, and for recording the first semantic commands in a task language file; and agent engine process for retrieving the first semantic commands from the task language file, for sending the first semantic commands to the first command processor to be executed again and for recording in the task language file information describing actions taken by the agent engine process;

wherein the recording means comprises:

class independent recorder means for recording in the task language file the information describing actions taken by the agent engine process, and a plurality of class dependent recorder means, each class dependent recorder means corresponding to an application process in the plurality of application processes, for receiving semantic commands from its corresponding application process and recording the semantic commands in the task language file.

12. A computing system comprising:

a viewing screen which displays images;

user interface means for enabling a user to select and move images displayed by the viewing screen;

a plurality of application processes, each application process responsive to selection and movement of the images on the viewing screen, and each application process including:

action processor process for monitoring the selection and movement of the images on the viewing screen and for generating semantic commands by lexical and syntactical analysis of the selection and movement of the images on the viewing screen, each of the semantic commands identifying an entity being operated on, where identification of the entity is independent of location of the images on the viewing screen, and command processor process for receiving the semantic commands from the action processor and for executing the semantic commands; and monitoring means, separate from the plurality of application processes, for intercepting semantic commands sent from a first action processor process in a first application process to a first command processor in the first application process.

13. A computing system as in claim 12 wherein each application process additionally comprises:

translate to external form means for translating semantic commands into an external form and for sending the semantic commands in external form to the monitoring means when the monitoring means is intercepting semantic commands.

14. In a computing system which includes a viewer screen and a user interface which enables a user to select and move images displayed on the viewing screen, a computer implemented method for recording user commands for later playback, the user commands being made by the user via selection and movement of images on the viewing screen, a first plurality of the user commands being executable by a first application process and a second plurality of the user commands being executable by one from a plurality of second application processes, the computer implemented method comprising the steps, performed by the computing system, of:

(a) translating, by each of the plurality of second application processes when active and the first application process when active, selection and movement of images on the viewing screen into semantic commands, each of the semantic commands identifying an entity being operated on, where identification of the entity is independent of location of the images on the viewing screen;

(b) transferring, by each of the plurality of second application processes, translated semantic commands to the first application process;

(c) recording, by the first application process, in a data file for later playback, the translated semantic commands.

15. In a computing system which includes a viewer screen and a user interface which enables a user to select and move images displayed on the viewing screen, a computer implemented method for executing semantic commands, the semantic commands representing user commands which are made by the user via selection and movement of images on the viewing screen, each of the semantic commands identifying an entity being operated on, where identification of the entity is independent of location of the images on the viewing screen, a first plurality of the semantic commands being executable by a first application process and a second plurality of the semantic commands being executable by one from a plurality of second application processes, the computer implemented method comprising the steps, performed by the computing system, of:

(a) reading, by the first application process, of semantic commands from a data file;

(b) executing, by the first application process, each semantic command in the first plurality of semantic commands, the first application process selecting and moving images on the viewing screen to identify to the user the semantic command which is being executed;

(c) transferring, by the first application process, each semantic command in the second plurality of semantic commands to one of the plurality of second application processes which is able to execute the semantic command; and (d) executing, by each of the plurality of second application processes, each semantic command received from the first application process, the second application processes selecting and moving images on the viewing screen to identify to the user the semantic command which is being executed.

* * * * *